3,597,318
PRODUCTION OF DOUBLE STRANDED RIBONUCLEIC ACID
Elisabeth Sinclair Sutherland, Iver Heath, and Christine Joy Bessell, Stoke Poges, England, assignors to Glaxo Laboratories Limited, Greenford, England
No Drawing. Continuation-in-part of application Ser. No. 602,494, Dec. 19, 1966. This application Nov. 17, 1969, Ser. No. 877,519
Claims priority, application Great Britain, Dec. 19, 1966, 54,972/65
Int. Cl. C12d *13/06*
U.S. Cl. 195—28        7 Claims

ABSTRACT OF THE DISCLOSURE

An antiviral substance active against both DNA and RNA viruses is produced by culturing a strain of *Penicillium chrysogenum* on a nutrient medium therefor, rupturing the cultured cells, fractionating the cell contents and recovering at least one double-stranded ribonucleic acid having a molecular weight of about 200,000 or greater.

---

This application is a continuation-in-part of application Elisabeth Sinclair Sutherland et al. Ser. No. 602,494 filed Dec. 19, 1966 for "Chemical Compounds" and now abandoned.

This invention concerns a novel antiviral material and a process for its preparation.

We have found that on release of the cell contents of the organism *Penicillium chrysogenum*, it is possible to isolate material possessing marked antiviral activity against both DNA and RNA viruses. The new substance is a nucleic acid or mixture of nucleic acids which is resistant to trypsin or deoxyribonuclease and is only slowly inactivated by ribonuclease under physiological conditions. These enzyme resistance characteristics show the active material to be a double stranded ribonucleic acid. At 4° C., it is soluble (about 1.0% or greater) in 2 M sodium chloride but is insoluble in 2 M sodium chloride containing 20% (v./v.) ethanol. It possesses and absorption maximum at about 259 m$\mu$. ($E_1^1 = 170_4 190$ in buffer at pH 7.5). On heating in 0.5 M perchloric acid at 70° C. for 20 minutes, the $E_1^1$ increased to 220–275. The most active material has a molecular weight of about 200,000 or greater. By the term molecular weight as used herein we mean the molecular weight as determined by exclusion in 0.1 M aqueous sodium chloride solution by a cross-linked dextran gel, e.g., Sephadex G 200, which excludes globulins at a minimum molecular weight of 200,000. Accompanying less active nucleic acids, possibly degradation products, possess lower molecular weights.

The new material has, for example, shown activity in tissue cultures against Semliki Forest virus, Influenza virus, e.g. A2, Parainfluenza I virus, Coxsackie virus A21, Poliovirus type I Brunenders, Rubella virus, Foot and mouth disease virus, Canine Distemper virus and Rhinovirus types 1B and 5, all of which are RNA viruses as well as against Vaccinia, Adenovirus SV17, Herpes simiae (virus B) and Herpes simplex viruses which are all DNA viruses. The tissue cultures in which the new antiviral material gave successful protection included primary monkey kidney, primary chick embryo, human embryonic lung cell strains, mouse L cells and rabbit kidney cell-line $RK_{13}$ (Glaxo Laboratories Limited). Protection was not successful in a baby hamster kidney cell line and a monkey kidney cell line. Mice dosed with the antiviral material survived for fourteen days after challenge with $100 \times LD_{50}$ of Semliki Forest virus, the control animals dying on the third or fourth day. The substance increased the survival time of suckling mice challenged with Coxsackie virus A21 or Semliki forest virus and weanling mice challenged with Herpes simplex or Semliki forest virus.

In general the new antiviral material is most effective in prophylactic treatment although against Herpes eye infections post-infection treatment was particularly successful and the new material is especially interesting in the opthalmic field.

The new antiviral material can be isolated in a form substantially free from the proteins and polypeptides with which it is associated in the cell-contents and such purified material constitutes a particular feature of the invention.

The new antiviral material may be formulated for administration in conjunction, if desired, with one or more pharmaceutical carriers or excipients or other medicinal agents suitable, for example, for oral, topitcal, rectal, intravaginal or parenteral administration. It may be used together with other medicinal agents for example anti-inflammatory agents such as steroids, e.g. betamethasone-21-phosphate or antibiotics such as tetracyline. The compositions are conveniently in dosage unit form and each dosage unit preferably contains at least 1 mg., advantageously at least 10 mg. for example at least 50 mg. and preferably not more than 500 mg., advantageously not more than 250 mg., for example, not more than 100 mg. of active material. The carried or excipient will in general be a solid carrier or excipient, a sterile liquid or a liquid containing one or more stabilising, flavouring, suspending, sweetening, emulsifying or preserving agents.

Solid preparations for oral consumption are usually presented in unit dose form and include for instance, tablets, capsules, lozenges, chewing gum and medicated sweets. Conventional carriers for such preparations may be sugars, starches, sugar alcohols, gelatin, chicle gum, cocoa butter, etc., together with other compounding agents required such as binders, lubricants, stabilisers, coatings, flavourings and colourings. The compositions may also take the form of liquid oral preparations for ingestion such as solutions, suspensions, syrups, elixirs, emulsions, granules for re-constitution before use, etc., which may contain suspending, emulsifying, stabilising and preserving agents and may also contain acceptable sweetening, flavouring or colouring agents. The compounds may be prepared for local application to the mucous membranes of the nose and throat and may take the form of liquid sprays or powder insufflations, nasal drops or ointments, throat paints, gargles or similar preparations. Topical formulations for the treatment of eyes and ears and external applications may be prepared in oily, aqueous or powdered media in the form of conventional ophthalmic preparations and collyria, skin paints, lotions, creams, ointments, dusting powders, medicated dressings, eye drops and lotions, etc. Aerosol forms of the preparations for local application may also be advantageous. Suppositories and pessaries may contain a conventional base e.g. oil of theobroma, polyglycols, glyco-gelatin bases together with surface active agents if required. The injectable preparations may take the form of aqueous or oily solutions, emulsions, suspensions or solids for reconstitution before use. Suitable vehicles include, for example, sterile, pyrogen-free water, parenterally acceptable oils, oily esters or other non-aqueous media such as propylene glycol, if desired containing suspending, dispersing, stabilising, preserving, solubilising, emulsifying or buffering agents.

The pharmaceutical compositions according to the invention preferably contain the active material at a concentration of 0.1 to 95% by weight, advantageously 0.5 to 40%.

According to a still further feature of the invention we provide a process for the production of a double stranded ribonucleic acid having antiviral activity whereby a strain of *P. chrysogenum* is cultured in or on a nutrient medium therefor, the cultured cells are ruptured and the cell contents are fractionated to yield at least one double stranded ribonucleic acid having a molecular weight of about 200,000 or greater and having antiviral activity.

The strain of *P. chrysogenum* is preferably one of the Thom strains, for example one of strains ATCC 9480, 10,238, 10,003, 10,002, 11,707 and 13,799. However we have found strain ATCC 10,002 to be especially suitable.

All strains of *P. chrysogenum* investigated contain virus-like particles which are thought to be necessary for producing the antiviral material according to the invention. The *P. chrysogenum* should not, therefore, be treated to destroy the virus-like particles prior to culture although breakdown of the particles may occur after harvesting the cells.

The growth of the organism may be carried out in the conventional way by either surface or submerged culture and by batch or continuous procedures. The nutrient medium will contain a source of nitrogen, such as nitrate, peptone, yeast or malt extract, ammonium salts, corn steep liquor etc., and a source of carbon and energy, e.g. a carbohydrate such as glucose, sucrose, lactose, maltose etc., or maize oil. Trace elements will normally also be present, for example potassium, sodium, magnesium, ferrous iron, chloride or phosphate. Particularly useful media for submerged culture include the following:

Medium 1:

| | Percent |
|---|---|
| Sucrose | 3 |
| Sodium nitrate | 0.2 |
| Potassium dihydrogen phosphate | 0.1 |
| Potassium chloride | 0.05 |
| Magnesium sulphate | 0.05 |
| Yeast extract (Difco) | 0.5 |
| Ferrous sulphate | 0.001 | pH adjusted to 6.8.

Medium 2:

| | Percent |
|---|---|
| Maltose | 4 |
| Peptone | 1 |
| Malt extract (Oxoid) | 2.4 | pH adjusted with NaOH to 7.0.

The cultures may be harvested when between 24 and 150 hours old.

The organism can also be grown in continuous culture using a suitable medium, for example:

Medium 3:

| | Percent |
|---|---|
| Sodium acetate | 1 |
| Ammonium sulphate | 0.85 |
| Potassium dihydrogen phosphate | 0.11 |
| Cornsteep liquor to give (N) | 0.0025 | pH adjusted to 6.5.

| | |
|---|---|
| Plus glucose (sterilized separately) | 2.2 |
| Plus maize oil | 0.16 |

The cells are preferably harvested before rupture or lysis to avoid the necessity of separating the nutrients from the desired product, and are preferably washed, e.g. with distilled water or dilute salt solution. They may then be subjected to extraction directly or may be stored e.g. in frozen form or in the form of an acetone powder, that is a powder formed by washing the mycellium free of water with acetone; such acetone powders may be stored at 4° C. without loss of activity.

The lysis or rupture of the cells may be effected, for example, by sonication, by mechanical homogenisation, grinding etc., by freezing and thawing or by treatment with lytic enzymes. A preferred method of rupturing the cells, however, is by treatment with an aqueous wetting agent, e.g. a long chain anionic wetting agent, for example an alkali metal long chain alkyl sulphate such as sodium lauryl sulphate. The preparation of acetone powders also enables the activity to be released slowly into an aqueous medium.

For medical use, the new material is preferably freed from the proteins and polysaccharides with which it is associated, for example by fractionation. The fractionation of the cell contents may be effected by conventional procedures taking into account the fact that the desired factor is a nucleic acid rather than a protein or polysaccharide and its molecular weight is high. In such fractionations, the characteristics of the desired product are important not only because they allow methods to be selected which will eliminate associated substances of unrelated chemical structure but also because they enable each fraction to be assayed for the product and those fractions to be rejected which contain little or no material of value. In assaying the products of the invention it is principally the antiviral activity of the desired product which may be used as a basis for estimation. Activity can, for example, be measured in arbitrary units based on protection tests in chick embryo monolayer and in the experimental work reported below one unit is defined as the amount which will give 50% protection when added to chick embryo monolayer 16–20 hours before infection with $TCD_{50} \times 100$ of Semliki Forest virus. ($TCD_{50}$=tissue culture dose 50—the dilution which infects 50% of the tissue culture tubes.)

Since the product comprises one or more nucleic acids, all the proteins and polypeptides in the cell content may be removed substantially completely. For treatment to remove protein etc., the cell contents should preferably be in aqueous solution. The ruptured cells are preferably extracted, for this purpose, with water or, advantageously, an aqueous solution of an electrolyte e.g. sodium chloride. A base such as sodium carbonate, bicarbonate, citrate etc. is also advantageously present. The pH can be alkaline with values up to pH 10 or even higher but exposure of the product to high pH should be for limited periods only, to avoid decomposition.

Protein removal is advantageously, but not necessarily effected, at least in part, before separation of the mycelial residue from the extract, e.g. by addition of a protein precipitant such as a hydroxy-benzene e.g. phenol or a detergent such as one of the long chain anionic wetting agents e.g. sodium dodecyl sulphate (preferably a 0.5 to 2.0% aqueous solution). Where a long chain anionic wetting agent has been used for the cell-rupture stage, this will also effect at least partial protein precipitation. The precipitant should not, of course, be one which precipitates the desired nucleic acid(s) as well as proteins and polypeptides. The aqueous solution preferably contains an electrolyte, e.g. 1 M NaCl to assist subsequent nucleic acid precipitation and to stabilise the desired double stranded ribonucleic acid material. Further purification may be effected by fractional precipitation, for example by addition to the cell-free extract of water-miscible solvents, e.g. alkanols or ketones such as methanol, ethanol, isopropanol, 2-methoxyethanol, 2-ethoxyethanol, actone, methyl ethyl ketone etc. The precipitate should contain the active material and the procedure is advantageously repeated one or more times i.e. by redissolving the precipitate and re-precipitating with a further quantity of the solvent. It is frequently advantageous to add cellulose in addition to the water-miscible solvent, whereby the nucleic acid material is held by the cellulose. Washing with an electrolyte containing aqueous solution of the water-miscible solvent serves to remove low molecular weight material and subsequent washing with water redissolves the desired nucleic acid. Where both proteins and polysaccharides are removed, protein removal may be effected before or after the polysaccharide removal stage.

Polysaccharides may be removed from the cell extract by conventional means, conveniently by distribution between a concentrated aqueous solution of an electrolyte, preferably phosphate buffer (1–2 M) at pH 7.7, and a suitable alkanol, e.g. 2-methoxyethanol, which will form a separate phase. Polysaccharides collect in the lower layer and the active material may be recovered from the upper layer by, for example, freeze drying after dialysis.

The active material can advantageously also be subjected to molecular sieve fractionation e.g. gel filtration using materials such as agarose, polyamides or cross-linked dextrans. Molecular sieve materials which fractionate materials of molecular weight of the order of 5000 to 200,000 or greater are required and, for example, in the Sephadex range of cross-linked dextrans grade G–200 is the most suitable. The gel-filtration on cross-linked dextran is preferably effected in aqueous solution containing a neutral electrolyte e.g. 0.1 M sodium chloride or 0.2 M sodium acetate.

In order that the invention may be well understood, we give the following examples by way of illustration only:

EXAMPLE 1

A spore suspension of *P. chrysogenum*, ATCC 10,002 was used to inoculate 250 ml. conical flasks containing 50 ml. of medium 1. After shaking at 26° C. for 4 days, the mycelium was separated by filtration, washed with distilled water and 0.1 M trisodium citrate solution and stored frozen.

15 g. of frozen mycelium was ground in approximately 1 g. lots, using an all-glass homogeniser, in a total volume of 100 ml. of ice-cold 6% sodium p-aminosilicylate solution (pH 7). After each fraction was ground it was poured immediately into a flask containing 100 ml. 90% aqueous phenol. After vigorous shaking for five minutes at room temperature (20–25° C.) the mixture was centrifuged at 5° C. for 45 minutes, the supernatant separated from the phenol and cell residues and then precipitated with two volumes industrial alcohol. After standing overnight at about 5° C., the precipitate was collected by centrifugation, redissolved in 12 ml. of water and 0.5 g. hydrated sodium acetate added, followed by 24 ml. of ethanol. This precipitation was repeated. The final precipitate dissolved in 50 ml. Earles Balanced Salt Solution was tested against Semliki Forest Virus in the chick monolayer system. A dilution of $\frac{1}{100}$ gave complete protection and $\frac{1}{200}$ gave more than 50% protection. The yield of activity was thus greater than 667 units/gram damp mycelium.

EXAMPLE 2

The fermentation broth from Example 7 was filtered and the mycelium suspended in 0.9% aqueous sodium chloride and re-filtered. The filtered mycelium was then suspended in 2 volumes of acetone, stirred and filtered. The acetone treatment was repeated and the final mycelial powder was sucked dry and stored at 4° C.

Each of 78 250 ml. conical flasks was charged with one gram acetone powdered mycelium suspended in 30 ml. 4% sodium chloride+0.4% sodium carbonate+0.4% sodium bicarbonate. The flasks were shaken on a rotary shaker for five hours at 26° C. At the end of this time 25 ml. of 90% aqueous phenol was added to each flask and shaking continued for a further half-an-hour. The contents of the flasks were bulked and filtered through a bed of Celite 545 kieselguhr filter-aid. The filtrate was centrifuged at 2000 r.p.m. at 5° C. The aqueous phase was separated and precipitated by the addition of two volumes of industrial alcohol. After standing overnight the precipitate was collected by centrifugation, dissolved in 150 ml. of the sodium chloride+carbonate+bicarbonate solution, and shaken vigorously for 15 minutes with an equal volume of 90% phenol. The aqueous phase was separated after centrifuging at 3600 r.p.m. and re-precipitated by the addition of 2 volumes of industrial alcohol. After a further precipitation, polysaccharides were removed in the following way. The solid was dissolved in the minimum volume of distilled water, one volume of 2.5 M dipotassium phosphate added, followed by 0.05 volume of 33% (v./v.) phosphoric acid and one volume 2-methoxyethanol. The mixture was shaken vigorously, centrifuged, and the upper phase separated and dialysed to remove the phosphate. The nondialysable fraction was reprecipitated with ethanol, and the precipitate dissolved in water and the volume adjusted to give a solution with optical density at 260 m$\mu$ (in water dilution) of 400. Solid sodium chloride was added to give a 1 M solution, followed by a half volume of ethanol. After keeping for three hours at about 5° C., the precipitate was spun down and the supernatant solution rejected.

The precipitate (total activity 15,200 U), was dissolved in water, the remaining ethanol removed under vacuum, and the volume adjusted until the optical density at 260 m$\mu$ was 400. Sodium chloride was added to give a 2 M solution, and after keeping at 5° C. overnight the insoluble material was rejected. To the 2 M NaCl solution $\frac{1}{10}$ volume of ethanol was added gradually, and the solution kept at 5° C. overnight. The precipitate was spun down and rejected. The ethanol concentration was increased to 16.6% and after keeping at 5° C. overnight the precipitate was centrifuged down, redissolved in water, dialysed and freeze-dried to yield 295 mg. of final product as a white solid containing 34 units/mg., a total of 10,030 units.

EXAMPLE 3

80 g. of acetone powdered mycelium were extracted in a similar manner to that given in Example 2, except that the extracting solution used was 4% sodium chloride+0.5% sodium dodecyl sulphate. After the 2 M sodium chloride insoluble fraction had been rejected, the ethanol concentration was increased in one step to 16.6% and the active precipitate collected after keeping at 5° C. overnight, dialysed and freeze-dried. Yield: 361 mg. assaying 33 units/mg., a total of 11,910 units.

EXAMPLE 4

The products from Examples 2 and 3 were combined with another solid of similar purity (191 mg. at 40 units/mg.), a total of 857 mg.; (29,580 units), and dissolved in 0.1 M sodium chloride, run through a 10 g. column of Sephadex-G200 packed in 0.1 M sodium chloride. The break-through was determined by measuring the optical density at 260 m$\mu$. The first 65 ml. after break-through was collected, dialysed to remove the sodium chloride, and freeze-dried to give 100 mg. solid assaying 200 units/mg., a total of 20,000 units.

EXAMPLE 5

250 g. acetone powdered mycelium, of low activity, was suspended in 6 litres of 4% sodium chloride and stirred for 1½ hours. Over the next 2½ hours 90 ml. N sodium hydroxide were added gradually with constant stirring. The final pH was 9.9. The mycelium was filtered down from the extract, and the pH of the filtrate (5.75 l.) adjusted to 5.7 with hydrochloric acid. An equal volume of acetone was added to the filtrate and it was then stored overnight at about 5° C.

The precipitate was collected by centrifugation and dissolved in 300 ml. of 4% sodium chloride +0.4% sodium carbonate +0.4% sodium bicarbonate, mixed vigorously with an equal volume of 90% aqueous phenol. The aqueous phase was separated, precipitated with industrial alcohol, reprecipitated once, and treated to remove polysaccharides as in Example 2. Activity at this stage was assayed at 10,400 units. After freeze-drying the solid was dissolved in 118 ml. 2 M sodium chloride (no precipitate separated on refrigerating) and ethanol was added to give a 10% solution. On keeping at 5° C. 1.15 g. of solid separated containing 2304 units (2 units/mg.). On addition of ethanol to 17% another 1.76 g. precipitated assaying 6,600 units (3.7 units/mg.), and on increasing the ethanol concentration to 23% 0.72 g. precipitated assaying 1440 units (2 units/mg.).

EXAMPLE 6

Frozen mycelium from a continuous fermentation of *Penicillium chrysogenum* ATCC 10,002 (1.0 kg. ca. 140 g. dry weight) was fragmented and added to a stirred solution of sodium chloride (400 g.) in water (10.0 l.); sodium lauryl sulfate (125 g. "Empicol" B.P.) in industrial methylated spirit (1.0 l.) and water (1.5 l.) was introduced and the mixture stirred for 27 hrs. at 26° C. On completion, the suspension was cooled to 2–5° C., filtered on a kieselguhr bed and the filtrate and washings diluted with industrial methylated spirit (20 l.). The precipitate was harvested after standing overnight by centrifuging at 2000 r.p.m./2° C. The alcohol-wet material was reprecipitated two times by dissolution in the minimum of water and addition of two volumes of industrial methylated spirit in the presence of a small amount of sodium acetate.

The wet product was dissolved in 0.2 M aqueous sodium acetate (500 ml.) by suspension and removal of the residual industrial methylated spirit under reduced pressure without external heating and aqueous phenol (500 ml., 90%) containing a trace of 8-hydroxyquinoline (ca. 0.1%) added. The emulsion was stirred for 20 min. at ambient temperature, cooled and centrifuged at 2000 r.p.m./2° C.; the aqueous (colourless) layer was separated and diluted with 2 volumes of industrial methylated spirit. The precipitate was removed by centrifugation at 2000 r.p.m./2° C., dissolved in the minimum quantity of water, precipitated with two volumes of industrial methylated spirit in the presence of a little sodium acetate, harvested as above and the precipitation once repeated to give an alcohol-wet cake.

The wet precipitate was suspended in water (300 ml.) and gradually dissolved as the excess alcohol was removed under reduced pressure, a mixture of aqueous dipotassium hydrogen phosphate (300 ml., 2.5 M), 2-methoxyethanol (300 ml.) and aqueous orthophosphoric acid (15 ml., 33% v./v.) was added and the phases mixed thoroughly. The upper phase was separated by centrifuging at 2000 r.p.m./2° C., dialysed against distilled water for 24 hrs. and freeze-dried. The resultant white non-deliquescent solid (4.5 g.) had $\lambda$ 260 m$\mu$. max. $E_1^1 = 167$ $\lambda$ 230 m$\mu$. min. $E_1^1 = 70$ protein 0.3% and very little or no observable free polysaccharide content. Biological results in vitro and in vivo show activity in tissue culture against Semliki forest virus in primary and secondary chick cells, human embryonic lung cells and activity against the same virus in mice. Activity: 30 units/mg.

EXAMPLE 7

60 ml. of a spore suspension of a monospore isolate of *Penicillium chrysogenum*, strain ATCC 10,002 were used to inoculate 3 litres of a semisynthetic medium in a conventional 5-litre fermenter acting as the first stage of a continuous fermentation. The medium had the following composition:

|  | Percent |
|---|---|
| Sodium acetate (anhydrous) | 1.0 |
| (NH$_4$)$_2$SO$_4$ | 0.85 |
| KH$_2$PO$_4$ | 0.109 |
| Cornsteep liquor to give (N) | 0.02 |
| 1% triethanolamine stearate in maize oil, pH 6.5 (40% NaOH) | 0.1 |
| Glucose (separately) | 2.2 |

The fermentation was agitated at 550 r.p.m., aerated with 3 l.p.m. air and maintained at 25° C. for 2 days. On the second day a synthetic medium having the composition:

|  | Percent |
|---|---|
| Sodium acetate (anhydrous) | 1.0 |
| (NH$_4$)$_2$SO$_4$ | 0.85 |
| KH$_2$PO$_4$ | 0.109 |
| Cornsteep liquor to give (N) pH 6.5 | 0.0025 |
| Glucose (separately) | 2.2 | was fed into the first stage fermenter at the rate of 10 litres per day with 4 ml. shots of maize oil every 4 hours. When the volume of fermenting liquor reached 5-litres it overflowed into a similar second fermenter operating under the same conditions. At convenient intervals the broth was harvested in 2–3 litre quantities under sterile conditions from the second stage.

The broth was filtered and the mycelium suspended in two volumes of 0.9% NaCl and filtered. The mycelial cake was then suspended in two volumes acetone, stirred and filtered. This was repeated, the final mycelial powder being sucked dry.

The mycelial powder was then treated as in Example 2 to yield a purified antiviral material.

EXAMPLE 8

(a) Extraction of mycelium

Deep frozen mycelium from *P. chrysogenum* (6.0 kg.) was broken up and added to a solution of sodium chloride (1.4 kg.) and sodium lauryl sulphate (Empicol, 438 g.) in water (40.25 l.) containing industrial methylated spirit (3.5 l.) prepared by previously dissolving the sodium lauryl sulphate in aqueous alcohol; the slurry was stirred for 26 hrs. at 26° C. ±2° C. and cooled to 10° C. Filtration of a kieselguhr bed gave a clear solution; this filtrate and aqueous washings (42 l.) were treated with calcium chloride (700 g.) in the minimum volume of water and stirred while the pH was adjusted to 9 with 1.0 N sodium hydroxide. After standing 18 hrs. at 10° C. the suspension was filtered, and the filtrate diluted with industrial methylated spirit (25 l.).

The precipitate was harvested by decantation and centrifuging the residual sludge at 2° C./1000×g; redissolved in water (1.5 l.) containing sodium acetate trihydrate (60 g.) and reprecipitated with industrial methylated spirit (3 l., 2 volumes). After standing at 2° C. for 18 hrs., the precipitate was harvested on a centrifuge at 2° C./1000×g, redissolved in a similar quantity of water, precipitated and harvested as above. The solid was dissolved in water (1.8 l.), 50 ml. removed for assay and the remainder passed to stage (b). The 50 ml. sample was freeze-dried to give 150 mg., other results are shown in Table 1.

(b) Phenol treatment (protein removal)

The solution from stage (a) (1.75 l.) was emulsified with a phenol solution (1.75 l., liquid phenol B.P.) and stirred for 30 minutes in the presence of 0.1% oxine (1.75 g.). Ssparation on the centrifuge at 5° C./1000×g for 40 min. gave two phases and a solid at the interface; the upper aqueous phase was removed, diluted with industrial methylated spirit (2 volumes, 3.0 l.) in the presence of sodium acetate trihydrate (60 g., 4% w./v.) and allowed to stand at 2° C. for 18 hrs. The precipitate was harvested on the centrifuge at 2° C./1000×g redissolved in water (500 ml.), reprecipitated with industrial methylated spirit and harvested in a similar manner. This precipitate was dissolved in water (650 ml.) a sample removed (50 ml.) and the remainder (600 ml.) passed to stage (c). On freeze-drying the sample yielded 409 mg.

(c) Cellosolve separation (carbohydrate removal)

To the solution from stage (b) (600 ml.) was added in order aqueous dipotassium hydrogen phosphate (2.5 M, 600 ml.), methyl Cellosolve (CH$_3$O·CH$_2$·CH$_2$·OH, 600 ml.) and 33% v./v. orthophosphoric acid (30 ml.); the emulsion was stirred for 30 minutes at ambient temperature and centrifuged for 1 hr. at 2° C./600×g. The upper phase was separated, sodium acetate trihydrate added to 4% (w./v.) and industrial methylated spirit (2 volumes) added. The precipitate was harvested with the centrifuge at 5° C./1000×g redissolved in water (1 l.) and reprecipitated with industrial methylated spirit (2 l.) in the presence of sodium acetate trihydrate (40 g.).

The solid was harvested with the centrifuge at 2° C./1000×g redissolved in the minimum quantity of water (500 ml.) and dialysed against 50 volumes of water for 2 days with two changes, distilled to small volume (100 ml.) at <35° C. under reduced pressure, redialysed and freeze-dried. Yield 2.8 g. constants and assays are shown in Table I. This material (less 300 mg.) was forwarded to stage (d).

(d) Cellulose treatment (molecular weight separation)

Cellulose (Whatman CF11, 100 g.) was washed free of fines and suspended in water (1.0 l.) containing sodium chloride (6.0 g.) and industrial methylated spirit (667 ml.). The suspension was stirred for 15 min., filtered and sucked almost dry. This cellulose was added to a solution from stage (c) containing 2.5 g. of nucleic acid in water (750 ml.). sodium chloride (4.5 g.) and alcohol (absolute, 500 ml.), the mixture stirred for 15 minutes and the cellulose harvested on a Büchner funnel. The cellulose and product were resuspended in water (375 ml.) containing sodium chloride (2.25 g.) and alcohol (absolute, 250 ml.) stirred for 15 minutes, harvested on a Büchner funnel and sucked as dry as possible. Stirring with water for 15 minutes (650 ml.) eluted the product from the cellulose which, was removed by filtration. The filtrate and washings (total 800 ml.) were dialysed against water to remove any sodium chloride and freeze-dried. Yield 0.665 g. (adjusted to account for removal at stages (a), (b), and (c) 0.830 g.) or 124 mg./kg. assuming that nuclei acid $E_1^1$=200 at 258 m$\mu$ max. Results of stages (a) to (d) assays, yields etc. are given in Table I.

added giving a total of 23% ethanol. Refrigeration and centrifugation as before gave precipitate (3).

Finally the total volume of ethanol added was made up to 500 ml. and the resultant precipitate (4) collected by centrifugation at 2000×g. All the precipitates were redissolved in distilled water, dialysed and freeze-dried.

The above procedure was repeated with a second sample (4 mg.) and the various corresponding fractions combined, with the exception of precipitate (2).

The results are shown in Table II below: The contents of Peak I and Peak II material were determined by method (f) (i) given hereinafter:

TABLE II

| Sample | Weight, g. | $E_1^1$ | Total optical density units | Percent content (based on optical density) of— | |
|---|---|---|---|---|---|
| | | | | Peak I | Peak II |
| Input | 9.2 | 145 | 134,000 | 15 | 22 |
| Precipitate (1) | 0.119 | 115 | 1,370 | | |
| Precipitate (2): | | | | | |
| (a) | 1.54 | 194 | 30,000 | >30 | >30 |
| (b) | 1.57 | 182 | 28,500 | | |
| Precipitate (3) | 1.34 | 174 | 23,300 | 4 | 16 |
| Precipitate (4) | 2.91 | 132 | 38,500 | | |
| Total | 7.48 | | 121,700 | | |

Where one optical density unit is the amount of nucleic and which dissolved in 1 ml. of 0.15 M sodium acetate gives an absorbance of 1.0 in a 1 cm. cell.

The starting solid material (10 g.) was derived from 250 kg. mycelium i.e. 40 mg. solid/kg. The total yield of precipitate (2) (16.7% ethanol) was ±13.5 mg./kg. and Peak I and Peak II were isolated by agarose gel filtration of the 16.7% ethanol precipitate in yields of 4.3 and 4.8 mg./kg. respectively.

(f) Gel filtration of fractionally precipitated material (f i) An approximately 50 mg. sample of the solid precipitated with 2/10 volume ethanol, as in (e) was dis-

TABLE 1

| Stage | Code | Yield calculated, g. | U.V. $E_1^1$ at — | | | Percent | | | |
|---|---|---|---|---|---|---|---|---|---|
| | | | 258 m$\mu$ | 280 m$\mu$ | $E_{min}^{max}$ | Glucose [1] | Protein [2] | Phosphorus [3] | Moisture [4] |
| Extraction | a | 5.4 | 88 | 48 | 1.63 | 1.8 | 4.93 | 4.9 | 5.3 |
| Phenol | b | 5.45 | 108 | 56 | 1.70 | 1.6 | 1.73 | 12.4 | 17.0 |
| Cellosolve | c | 3.12 | 172 | 88 | 2.00 | 0.0 | 1.21 | 7.25 | 12.2 |
| Cellulose | d | 0.83 | 180 | 92 | 1.98 | 0.0 | 1.24 | 6.2 | 14.2 |

[1] By Anthrone assay.
[2] By the method of Miller: Anal. Chem. 1959, 31 964.
[3] By ammonium molybdate assay as P percent.
[4] By drying at 120° C.

The ED$_{50}$ of the stage (d) material as measured against Semliki Forest virus in young mice was 3.81 mg./kg.

The LD$_{50}$ of this material in young mice was 70 mg./kg.

If desired, stage (c) can be carried out before stage (b) or after stage (e) described hereinafter.

(e) Fractional precipitation 4.5 g. of solid prepared as above but omitting stage (c), was dissolved in distilled water. The volume was made up to 250 ml., after sodium chloride had been added to give a final concentration of 1 M. The solution was cooled at 4° C. for 18 hours, centrifuged at 23,000×g for 1 hour at 4° C., when precipitate (1) separated. To the supernatant was added 15 g. sodium chloride (to give ~2 M) and refrigeration and centrifugation were repeated. No additional precipitate could be detected.

The supernatant was allowed to warm to room temperature (25° C.) and one fifth volume (50 ml.) of absolute ethanol added slowly with mixing (giving 16.7% ethanol, assuming no change in volume). Refrigeration overnight and centrifugation as before gave precipitate (2).

The supernatant was allowed to warm to room temperature, and one tenth original volume (25 ml.) ethanol was solved in 20 ml. 0.075 M sodium acetate-5 m. M magnesium acetate and applied to an approx. 800 cc. column of beaded 4% agarose (Bio-Gel A–15m) packed in the same salt solution. The column was developed by upward flow, at a temperature of 20–25° C., using the same salt solution and 10 ml. fractions were collected. The effluent was monitored for absorption at 254 m., and by this means, three major nucleic acid fractions were detected.

The rather broad excluded peak (fractions 28–40) was termed Peak I and the second major peak eluting in fractions 51–59 was termed Peak II. Fractions 60–90 contained nucleic acids of lower molecular size, possibly degradation products. There was also an indication of a minor nucleic acid fraction, intermediate between Peaks I and II.

The distribution of optical density was as follows:

| Fraction: | Optical density units |
|---|---|
| 28–40 | 310 |
| 41–50 | 137 |
| 51–59 | 310 |
| 60–90 | 240 |

It should be understood that, at this level of loading, there is no definite gap between the elution of the various peaks: the fractions were combined in order to obtain as much of the desired material with as little contamination as possible. In order to obtain fractions approaching homogeneity of molecular size, a second separation by gel filtration can be carried out, preferably using a material of different exclusion properties. The fractions indicated were combined, concentrated under vacuum, at a temperature not exceeding 35° C., to approximately one tenth the original volume, and precipitated by the addition of two volumes ethanol. They were stored in this condition at 5° C., or the precipitates separated, redissolved in dilute salt solution, and stored frozen (at —20° C.).

Fractions 28–40 from ten gel filtration separations as described above were combined by bulking the precipitated fractions. The precipitates were separated by centrifugation, but the larger part of the gel-like precipitated material wes very buoyant, and had to be removed from the surface using a glass rod. The precipitated material was dissolved in the minimum volume of distilled water, dialysed at 5° C. against 5 litres distilled water overnight, and against fresh distilled water for a further period of 5 hours. Prolonged dialysis was avoided as this may cause losses of antiviral activity. The resulting solution was centrifuged at 38,000×g for 30 minutes at 5° C. to remove any insoluble contaminants, and the supernatant freeze-dired.

Yield: 188 mg. $E_1^1$ 136

The fractions 51–59 were combined and similarly treated to give Peak II, 209 mg. $E_1^1$ 168.

(f.ii) In another preparation, the same material as obtained in (e), but treated to remove polysaccharides as in (d), was subjected to similar gel-filtration, on Bio-Gel Al.5m; in this case the sodium acetate concentration was raised to 0.15 M and the magnesium acetate omitted from the medium. The first seven to eight fractions eluted from each of eleven columns were combined, and after concentration, dialysis and freeze-drying as above, yielded 126 mg. of solid of $E_1^1$ 162 (Peak I).

A sample (21 mg.) of this solid was loaded on an approximately 800 cc. column of 2% beaded agarose (Bio-Gel A50m) packed in 0.15 M sodium acetate. The apparently excluded peak was again rather broad. The first fifteen fractions following break through, (containing 80% of the input optical density) were combined, concentrated, dialysed and freeze-dried. This solid (peak I) had an $E_1^1$ of 165 and $S_{20,w}$ 12.0. The base analysis, after hydrolysis by the method of Smith and Markham (Bio. J. 1950 46, 509) and paper chromatography according to Wyatt (Bio. J. 1951, 48 548) was as follows:

Guamine 25.7  Adenine 24.9  Cytosine 24.9  Uracil 24.4

(Uncorrected for losses during hydrolysis—results as moles base per 100 moles recovered).

(f.iii) The same input material as used in example (f.ii) was separated on Bio-Gel Al.5m columns run in 0.15 M sodium acetate at 5° C. Fractions 51–62, forming the second main peak of ultra-violet absorbing material were combined, concentrated and refractionated on columns or 8% beaded agarose (Bio-Gel Al.5m), run in 0.15 M sodium acetate. A small amount of the input matrial was excluded by the gel. The main peak was retarded and showed considerable tailing. The fractions were combined as follows:

| Fractions: | Optical density units |
|---|---|
| 38–44 | 24 |
| 45–53 | 373 |
| 54–65 | 210 |

(Input 630 optical density units)

Fractions 45–53, the early fractions of the main peak, were combined, concentrated, dialysed and freeze-dried to yield 26.5 mg. solid Peak II. Base analysis calculated as in f(2)).

Guanine 20.4  Adenine 30.9  Cytosine 17.3  Uracil 31.5

(f.iv) A sample of the same input material as was used in (f.ii), and (f.iii) was dissolved in 0.33 M sodium chloride; ribonuclease (1 mcg./ml.) was added and the solution kept at 5° C. for 24 hours before loading onto a column of Bio-Gel Al.5m in 0.15 M sodium acetate at 5° C. Fractions 49–65, forming the second peak, were combined, concentrated and re-fractionated on columns of Bio-Gel A1.5m run in 0.15 M sodium acetate. In this separation the main peak was quite symmetrical and accounted for 73% of the input optical density. The peak fractions, 46–55, were combined, concentrated, treated with phenol, and reprecipitated three times with ethanol from solution in 0.1 M sodium acetate. The final precipitate was dissolved in distillied water, dialysed briefly and freeze-dried to yield 27.5 mg. of Peak II solid, $S_{20,w}$ 8.2

Base analysis (calucualted as in f(2))

Guanine 18.8  Adenine 31.7  Cytosine 17.8  Uracil 31.7

Properities of Peak I and Peak II nucleic acids

The samples of the fractionated nucleic acids were prepared as described in f (ii), (iii), and (iv).

(1) Resistance to ribonucleas.—The nucleic acids were dissolved in standard saline citrate (SSC—0.15 M sodium chloride, 0.015 M sodium citrate, pH 7.0) at a concentration to give an optical density of approximately 1.0 at 260 m$\mu$, and treated with 0.2 msg./ml. commercial pancreatic ribonuclease at 25° C. Both Peak I and Peak II gave no increase in optical density under these conditions.

When the salt solution was diluted one in ten (0.1× SSC) the optical absorbance of the Peak II sample rose rapidly in the presence of ribonuclease, and had increased by over 20% in one hour. Under these conditions the peak I sample also showed some increase in optical density, but the hyperchromism observed in this case was only 8% in one hour.

(2) Thermal denaturation.—The effect of heat on the ultraviolet absorption of a nucleic acid, in solution in defined salt concentrations, is characteristic of the nucleic acid and determined by the degree of order of its secondary structure.

The Peak I sample showed no hyperchromism below 60° when heated in 1.0×, 0.1× or 0.01× SSC (defined as above). The Tm (temperature required to give half the maximum hyperchromism at 259 m.) in 0.01× SSC was approximately 79° C.

The Peak II sample showed no increase in absorbance below 50° C. when heated in 0.01× SSC. The Tm was approximately 68° C., under these conditions.

(3) Behaviour on electrophoresis in polyacrylamide gel.—The following solutions were required to prepare the polyacrylamide gels:

(a) 10% recrystallised acrylamide and .5% recrystallised methylene bisacrylamide in water.
(b) Buffer solution: 0.2 M tris, 0.1 M sodium acetate, 10 mM. sodium ethylene diamine tetra acetate, adjusted to pH 7.8 with acetic acid.
(c) N,N,N',N'-tetramethylethylenediamine, diluted 1 in 3 v./v. in distilled water.
(d) Aqueous ammonium persulphate 1% w./v.

Preparation of 5% polyacrylamide gels.

10 ml. of the acrylamide solution, 4 ml. buffer, and 4.3 ml. distilled water were mixed and de-gassed; then 0.1 ml. of the tetramethylethylenediamine solution and 1.6 ml. of the ammonium persulphate solution were mixed in, and the solution transferred rapidly to previously prepared silica tubes 8 mm. diam. x 8 cm. long temporarily sealed at one end. The tubes were filled to a height of 6 cm. and the contents left to polymerise after a few drops of water had been gently layered on the surface. The gels were preferably stored overnight before use, and then pre-run for two hours at 5 milliamps per tube. The running buffer used to fill the reservoirs, was the same as used in the preparation of the gels, but diluted 1 in 5 (v./v.).

After pre-running, the buffer filling the tubes was emptied out, and the upper surfaces of the gels dried with strips of filter paper. Nucleic acid samples were applied in 20% sucrose solution, preferably as a single drop containing 25–100 mcg. nucleic acid. The running buffer was gently layered over the sample, and fresh buffer used for both reservoirs. After running for 180 minutes at 5 milliamps per tube (100 volts) at 25° C. the tubes were removed, and the ultraviolet absorption of nucleic acid bands was recorded using a Joyce-Loebl Chromoscan. Alternatively, the gels were extruded from the tubes, soaked for 1 hour in 7% (v./v.) glacial acetic acid, stained overnight in 0.2% (w./v.) methylene blue, and destained by repeated washing.

The Peak I sample, under these conditions, gave an apparently multiple band, which had moved 5–6 mm. from the origin. The Peak II sample showed a well-defined single band, which had moved 37–39 mm. from the origin. Both samples showed only slight diffuse staining apart from the main bands described.

The fractionally precipitated material, obtained as in (e), from which the separated samples were prepared, showed the same bands and also a sharp trace band 25–26 mm. The low molecular weight nucleic acids gave no definite bands, but only diffuse staining—or ultraviolet absorption.

When the Peak I sample was run in the same system, but at 2.5 milliamps/tube for 16 hours at 5° C., staining the gel with methylene blue (in 0.4 M acetate buffer pH 4.7) revealed a strong double band 15–16 mm. from the origin, and a fainter single band about 1 mm. slower.

(4) The behaviour of Peaks I and II on gel filtration.—The elution characteristics reported are those which we have observed using various commercially available gel filtration media. Since substantial differences can occur between different batches of such materials, the elution volumes given in the table should be regarded as indicative of the degree of retardation to be expected, rather than as absolute reproducible properties.

The peak I nucleic acid appears to be largely excluded by comparison with Peak II from all the gel filtration media listed below, probably including the 2% agarose (Bio-Gel A50m) although the void volume (Vo) of this column was not determined.

In general, the higher the ionic strength, the greater the degree of retardation, as the nucleic acids occurs in more compact forms, but this effect is less marked with double-stranded nucleic acids than with single-stranded nucleic acids.

which is excluded by the gel, in $10^3$ units in the Sephadex and Bio-Gel P series and in $10^6$ units in the Bio-Gel A series.

Biological Activity of Peaks I and II in mice

Determination of blood interferon levels in young adult mice at varying times after intraperitoneal injection of the Peak I and Peak II materials in physiological saline, showed differences between the times of maximum interferon titre as shown below:

Peak I (1 mg./kg.): serum interferon peak 6–18 hours after injection

Peak II (1 mg./kg.): serum interferon peak ½ to 6 hours after injection.

The optimal times for intraperitoneal injection of the Peak I and Peak II materials into young adult mice to give protection against Semliki Forest virus was also determined as shown below:

Peak I: optimal time for dosing 12–8 hours before virus challenge

Peak II: optimal time for dosing 4–6 hours before virus challenge (6) Behaviour of Peaks I and II on ultracentrifugation Peak I: $S_{20,w}$ 12.0
Peak II: $S_{20,w}$ 8.2

Where $S_{20,w}$ is the sedimentation constant in Svedberg units determined in 0.01 M phosphate buffer (pH 7) at very low nucleic acid concentration, corrected to its value in a solvent with the density and viscosity of water at 20° C.

EXAMPLE 9

Drops for eyes (or ears)

Active antiviral ingredient: 2% w./v.
Methyl cellulose (4000 c.p. grade): 1% w./v.
Phenyl ethanol: 0.5% v./v.
Sodium chloride: 0.5% w./v.
Water for injection B.P. to 100 vols.

Add 30 vols of boiling water to the methyl cellulose, stir and leave for 2–3 hours. Dilute with a further 30 vols. of cold water and stir until a clear solution is obtained. Strain free from particulate matter and sterilise the solution (a) by autoclaving at 15 p.s.i. for 20 minutes. Cool to room temperature. Dissolve the solids in the remaining water to which has been added the phenyl ethanol. Sterilise this solution (b) by filtration, e.g. through a 5/3 sintered glass filter. Mix solutions (a) and (b) under sterile conditions, make up to volume, if required, and aseptically distribute the resulting mix into small, sterile, eye-drop containers e.g. of 2 ml. capacity.

GEL FILTRATION CHARACTERISTICS OF PEAKS I AND II

| Gel filtration medium | Salt solution | Temp. (° C.) | Vol required to elute fraction (as percentage total column ol.) | |
|---|---|---|---|---|
| | | | Peak I | Peak II |
| Sephadex G200 | 0.1 M sodium chloride | 20–25 | 35–50 | 38–52 |
| Bio-Gel P200 | 0.075 M sodium acetate | 20–25 | 24–36 | 32–44 |
| Bio-Gel P300 | 0.075 M sodium acetate–5 m. M magnesium acetate | 20–25 | 24–36 | 35–49 |
| Bio-Gel A1.5m | do | 20–25 | 42–54 | 54–67 |
| Do | 0.15 M sodium acetate | 20–25 | | 48–58 |
| Bio-Gel A5m | 0.2 M sodium acetate –0.001 M EDTA | 20–25 | 40–52 | 56–67 |
| Bio-Gel A1.5m | 0.075 M sodium acetate –5 m. M. magnesium acetate | 20–25 | 35–46 | 59–68 |
| Do | 0.15 M sodium acetate –10 m. M magnesium acetate | 5 | 37–50 | 69–80 |
| Do | 1.0 M sodium chloride | 20–25 | | 68–79 |
| Do | 0.15 M sodium acetate | 5 | 39–49 | 67–79 |
| Do | do | 20–25 | 39–47 | 56–70 |
| Do | 0.15 M sodium acetate – 0.001 M EDTA | 20–25 | 39–50 | 61–75 |
| Bio Gel A50m | 0.15 M sodium acetate – 5 m. M magnesium acetate | 5 | 38–55 | |
| Do | 0.15 M sodium acetate | 20–25 | 41–54 | |

Gel filtration media

Sephadex is a dextran gel cross-linked with ethylene oxide
Bio-Gel P is a polyacrylamide gel
Bio-Gel A is an agarose gel
The number suffixed to each gel in the foregoing table refers to the minimum molecular weight of globulin

EXAMPLE 10

Cream (for external application)

Active antiviral ingredient 5% w./w. in Hydrophyllic Ointment U.S.P.

Dissolve the antiviral material in the water available and use the solution for the preparation of the cream as directed in the United States Pharmacopoeia.

EXAMPLE 11

Nasal Drops (or throat spray)

Active antiviral ingredient: 3% w./w.
Chlorbutol: 0.5% w./w.
Sod. dihydrogen phosphate B.P.: 0.5% w./w.
Sodium phosphate B.P.: 1.2% w./w.
Sorbitol solution 70% distilled water: equal parts to 100 vols.

Dissolve the chlorbutol in the sorbitol/distilled water vehicle, heated to 90° C. Cool, add the phosphate buffers and finally the antiviral material and stir until dissolved. Make up to volume, filter free from particulate matter and distribute into small containers adapted for use either as droppers or sprays.

We claim:

1. A process for the production of a double stranded ribonucleic acid substance having antiviral activity, comprising culturing a setrain of *Penicillium chrysogenum* in or on a nutrient medium therefor, rupturing the cultured cells, fractionating the cell contents by fractional precipitation, solvent-partitioning or gel-filtration and recovering at least one nucleic acid having a molecular weight of about 200,000 or greater and having antiviral activity.

2. A process as claimed in claim 1 in which said strain of *Penicillium chrysogenum* is strain ATCC 10,002.

3. A process as claimed in claim 1 in which rupture of the cells is effected by treatment with an alkali metal long chain alkyl sulphate.

4. A process as claimed in claim 1 in which fractionation of the cell contents is effected by addition of phenol or an alkali metal long chain alkyl sulphate to remove protein from the nucleic acid material.

5. A process as claimed in claim 1 in which fractionation of the cell contents is effected by precipitation of the nucleic acid material from aqueous solution leaving unwanted materials in solution.

6. A process as claimed in claim 1 in which fractionation of the cell contents is effected by distribution between a concentrated aqueous buffer solution and an alkanol immiscible therewith whereby polysaccharides are retained in the lower phase while the desired nucleic acid material is retained in the upper phase.

7. A process as claimed in claim 1 in which fractionation of the cell contents is effected by gel-filtration on a molecular sieve material selected from the group consisting of a cross-linked dextran, agarose and a polyamide, said molecular sieve material being capable of fractionating materials of molecular weight of at least 5000.

References Cited

Nat. Acad. Science, Proceedings vol. 58, No. 2, pages 782–789 (1967).

ALVIN E. TANENHOLTZ, Primary Examiner

U.S. Cl. X.R.

260—211.5; 424—88

UNITED STATES PATENT OFFICE
CERTIFICATE OF CORRECTION

Patent No. 3,597,318              Dated August 3, 1971

Inventor(s) Elisabeth Sinclair Sutherland and Christine Joy Bessell

It is certified that error appears in the above-identified patent and that said Letters Patent are hereby corrected as shown below:

Column 1, line 3, "HIBONUCLEIC" should read -- RIBONUCLEIC --.

Column 1, line 10, "Dec. 19, 1966" should read -- Dec. 28, 1965

Signed and sealed this 25th day of January 1972.

(SEAL)
Attest:

EDWARD M. FLETCHER, JR.          ROBERT GOTTSCHALK
Attesting Officer                Commissioner of Patents